United States Patent
Belva

(10) Patent No.: US 9,356,955 B2
(45) Date of Patent: May 31, 2016

(54) METHODS FOR DETERMINING CROSS-SITE SCRIPTING AND RELATED VULNERABILITIES IN APPLICATIONS

(71) Applicant: Kenneth F. Belva, New York, NY (US)

(72) Inventor: Kenneth F. Belva, New York, NY (US)

(73) Assignee: Kenneth F. Belva, New York, NY (US)

(*) Notice: Subject to any disclaimer, the term of this patent is extended or adjusted under 35 U.S.C. 154(b) by 0 days.

(21) Appl. No.: 14/658,393

(22) Filed: Mar. 16, 2015

(65) Prior Publication Data
US 2015/0264082 A1 Sep. 17, 2015

Related U.S. Application Data

(60) Provisional application No. 62/126,412, filed on Feb. 27, 2015, provisional application No. 62/029,625, filed on Jul. 28, 2014, provisional application No. 61/953,775, filed on Mar. 15, 2014.

(51) Int. Cl.
*H04L 29/06* (2006.01)
*H04L 29/08* (2006.01)
*G06F 21/57* (2013.01)

(52) U.S. Cl.
CPC .......... *H04L 63/1466* (2013.01); *G06F 21/577* (2013.01); *H04L 63/1416* (2013.01); *H04L 67/02* (2013.01); *G06F 2221/033* (2013.01); *H04L 63/1433* (2013.01)

(58) Field of Classification Search
CPC .................. H04L 63/1416; H04L 63/1433
USPC .......................................................... 726/25
See application file for complete search history.

(56) References Cited

U.S. PATENT DOCUMENTS

| | | | | |
|---|---|---|---|---|
| 8,464,318 B1* | 6/2013 | Hallak | ............... | H04L 63/1416 726/4 |
| 2008/0034425 A1* | 2/2008 | Overcash | ............... | G06F 21/55 726/22 |
| 2011/0219454 A1* | 9/2011 | Lee | ............... | G06F 17/30 726/25 |
| 2011/0307389 A1* | 12/2011 | Francia | ............... | G06Q 20/12 705/67 |
| 2012/0011432 A1* | 1/2012 | Strutton | ............... | G06Q 30/02 715/234 |
| 2013/0111594 A1* | 5/2013 | Amit | ............... | G06F 21/52 726/25 |
| 2013/0262626 A1* | 10/2013 | Bozek | ............... | H04L 67/10 709/217 |
| 2014/0297666 A1* | 10/2014 | Morris | ............... | G06Q 10/109 707/754 |
| 2014/0343976 A1* | 11/2014 | Ahluwalia | ............... | G06Q 10/02 705/5 |

\* cited by examiner

*Primary Examiner* — Dao Ho

(57) ABSTRACT

The invention provides computer-implemented methods and computer systems for testing applications such as web-based (HTTP) applications for cross-site scripting (XSS) and related security vulnerabilities and permits the discovery of previously unknown XSS and related vulnerabilities in applications without relying on known or previously generated static XSS signatures. The invention may be applied to any type of XSS or related vulnerability for any variation of application code.

6 Claims, 8 Drawing Sheets

```
                Scenario #1 - In HTML Attribute Tag

Potentially Vulnerable Code
<a href="http://www.examplesite.none">Click this link</a>

Where Attacker's code would execute
<a href="Attacker's Code">Click this Link</a>

Run Method:

9b1e3f
<a href="9b1e3f">Click this Link</a>

9b1e3f:9b1e3f

<a href="9b1e3f:9b1e3f">Click this Link</a>

Attacker Needs " > < / to end the A tag and insert his script code

9b1e3f"9b1e3f - Pass
<a href="9b1e3f"9b1e3f">Click this Link</a>

9b1e3f>9b1e3f - Pass
<a href="9b1e3f>9b1e3f">Click this Link</a>

9b1e3f<9b1e3f - Pass
<a href="9b1e3f<9b1e3f">Click this Link</a>

9b1e3f/9b1e3f - Pass
<a href="9b1e3f/9b1e3f">Click this Link</a>

Attack Characters Needed: "<>/
Attacker's Code:  "><script>alert(10)</script><a>
<a href=""><script>alert(10)</script><a>Click this Link</a>
```

FIG. 1A

```
9b1e3f>9b1e3f - Fail
<a href="9b1e3f>9b1e3f">Click this Link</a>
```

FIG. 1B

```
Scenario #2 - Malformed HTML with single quotes instead of double quotes

Potentially Vulnerable Code
<a href='http://www.examplesite.none'>Click this link</a>

Where Attacker's code would execute
<a href='Attackers Code'>Click this Link</a>

Run Method:

9b1e3f

<a href='9b1e3f'>Click this Link</a>

9b1e3f:9b1e3f

<a href='9b1e3f:9b1e3f'>Click this Link</a>

Attacker Needs ' > < / at a minimum to end the A tag and insert his code

9b1e3f'9b1e3f - Pass
<a href='9b1e3f'9b1e3f'>Click this Link</a>

9b1e3f>9b1e3f - Pass
<a href='9b1e3f>9b1e3f'>Click this Link</a>

9b1e3f<9b1e3f - Pass
<a href='9b1e3f<9b1e3f'>Click this Link</a>

9b1e3f/9b1e3f - Pass
<a href='9b1e3f/9b1e3f'>Click this Link</a>

Attack Characters Needed: '<>/
Attacker's Code:  '><script>alert(10)</script><a>
<a href=''><script>alert(10)</script><a>Click this Link</a>
```

FIG. 2A

```
9b1e3f'9b1e3f - Fail
<a href='9b1e3f'9b1e3f'>Click this Link</a>

9b1e3f>9b1e3f - Fail
<a href='9b1e3f>9b1e3f'>Click this Link</a>
```

FIG. 2B

Scenario #3 - In HTML Body

Potentially Vulnerable Code
`<a href="http://www.examplesite.none">Click this link</a>`

Where Attacker's code would execute
`<a href="http://www.examplesite.none">Attacker's Code</a>`

Run Method:

9b1e3f

`<a href="http://www.examplesite.none">9b1e3f</a>`

9b1e3f<9b1e3f - Pass
`<a href="http://www.examplesite.none">9b1e3f<9b1e3f</a>`

9b1e3f>9b1e3f - Pass
`<a href="http://www.examplesite.none">9b1e3f>9b1e3f</a>`

9b1e3f/9b1e3f - Pass
`<a href="http://www.examplesite.none">9b1e3f/9b1e3f</a>`

Attack Characters Needed: <>/
Attacker's Code:   `<script>alert(10)</script>`
`<a href="http://www.examplesite.none">  <script>alert(10)</script>  Click this Link</a>`

FIG. 3A

9b1e3f>9b1e3f - Potential Fail (depends on rendering)
`<a href="http://www.examplesite.none">9b1e3f<9b1e3f</a>`

FIG. 3B

```
import os
import hashlib
#-------------------------------------------------------------------------
def md5sum(string):
#-------------------------------------------------------------------------
    m = hashlib.md5()
    m.update(string)
    return m.hexdigest()
#-------------------------------------------------------------------------
def generateSlug(data):
#-------------------------------------------------------------------------
    #we prevent duplicate slugs from being generated:
    # we need a condition in here where if we use all of the slugs we add 1 to md5lehgth
    SlugExists = True while SlugExists:
        md5string = md5sum(data + str(os.urandom(10)))
        if xssCommonFunctions.globalVariables.md5shorten:
            # note that in application "7" is a variable and may be changed dynamically
            # it is hard coded here for demonstration purposes.
            md5string = md5string[0:7]

sqlString = "SELECT * from tURLs where tURLs_slug='" + md5string + "'"
        sql_results = read_sqlite(sqlString)
        if not sql_results:
            SlugExists = False return md5string start here <------ url =
"http://192.168.56.103/testScripts/reflect.php?HTMLtext=HTML2ndtext&HTMLtext=HTMLtex
t&HTMLattDQ=HTMLattDQ&HTMLattSQ=HTMLattSQ&scriptattr=scriptattr&scripttag=scrip
ttag"
parameter = "HTMLtext"
data = url + parameter
md5Slug = generateSlug(data)
[replace field value with md5Slug value]
```

FIG. 4

```
root@dev-workstation:~/workspace/xssWarriorExploit# ./xssExploitPrint.py
#------------------------------------------------
#     HTML Text
#------------------------------------------------
Full HTML string: <a
href="http://xssWarrior.com">6ea261c8cf3d49c7fe1ab1a8fc2bfa22</a>
Left String: <a href="http://xssWarrior.com">
Right String: </a>
Left Characters: <="://.">
Right Characters: </>

XSS_char_test (XSS_char_test_ExploitSyntaxPre):
XSS_char_test (XSS_char_test_ExploitSyntaxFullHTML): </>

Exploit String (buildExploitAttribute):
<script>alert('XSS!')</script></a>
Full HTML Syntax with Exploit (buildExploitAttribute): <a
href="http://xssWarrior.com"><script>alert('XSS!')</script></a></a>

XSS_char_test (XSS_char_test_ExploitSyntaxFullHTMLwExploit): <>('!)/

#------------------------------------------------
#     HTML attribute (Case #1: Single Quote)
#------------------------------------------------
Full HTML string: <a href='6ea261c8cf3d49c7fe1ab1a8fc2bfa22'>website
link</a>
Left String: <a href='
Right String: '>website link</a>
Left Characters: <='
Right Characters: '></>

XSS_char_test (XSS_char_test_ExploitSyntaxPre): '>
XSS_char_test (XSS_char_test_ExploitSyntaxFullHTML): '></

Exploit String (buildExploitAttributeReverseMethod): '>website
link</a><script>alert('XSS!')</script><a href='
Full HTML Syntax with Exploit (buildExploitAttributeReverseMethod): <a
href=''>website link</a><script>alert('XSS!')</script><a href=''>website
link</a>

Exploit String (buildExploitAttribute):
'><script>alert('XSS!')</script></a>
Full HTML Syntax with Exploit (buildExploitAttribute): <a
href=''><script>alert('XSS!')</script></a>'>website link</a>

XSS_char_test (XSS_char_test_ExploitSyntaxFullHTMLwExploit): '><(!)/
```

FIG. 6

```
#------------------------------------------------
#    HTML attribute (Case #2: Double Quote)
#------------------------------------------------
<a href="6ea261c8cf3d49c7fe1ab1a8fc2bfa22">website link</a>
Left String: <a href="
Right String: ">website link</a>
Left Characters: <="
Right Characters: "></>

XSS_char_test (XSS_char_test_ExploitSyntaxPre): ">
XSS_char_test (XSS_char_test_ExploitSyntaxFullHTML): "></

Exploit String (buildExploitAttributeReverseMethod): ">website
link</a><script>alert('XSS!')</script><a href="
Full HTML Syntax with Exploit (buildExploitAttributeReverseMethod): <a
href="">website link</a><script>alert('XSS!')</script><a href="">website
link</a>

Exploit String (buildExploitAttribute):
"><script>alert('XSS!')</script></a>
Full HTML Syntax with Exploit (buildExploitAttribute): <a
href=""><script>alert('XSS!')</script></a>">website link</a>

XSS_char_test (XSS_char_test_ExploitSyntaxFullHTMLwExploit): "><('!)/

#------------------------------------------------
#    HTML attribute (Case #3a: Dynamic Exploit Choice)
#------------------------------------------------
<body  BGCOLOR="#FFFFCC">6ea261c8cf3d49c7fe1ab1a8fc2bfa22</body>
Left String: <body  BGCOLOR="#FFFFCC">
Right String: </body>
Left Characters: <="#">
Right Characters: </>

XSS_char_test (XSS_char_test_ExploitSyntaxPre):
XSS_char_test (XSS_char_test_ExploitSyntaxFullHTML): </>

Exploit String (buildExploitAttributeReverseMethod):
</body><script>alert('XSS!')</script><body  BGCOLOR="#FFFFCC">
Full HTML Syntax with Exploit (buildExploitAttributeReverseMethod): <body
BGCOLOR="#FFFFCC"></body><script>alert('XSS!')</script><body
BGCOLOR="#FFFFCC"></body>

Exploit String (buildExploitAttribute):
<script>alert('XSS!')</script></body>
Full HTML Syntax with Exploit (buildExploitAttribute): <body
BGCOLOR="#FFFFCC"><script>alert('XSS!')</script></body></body>

XSS_char_test (XSS_char_test_ExploitSyntaxFullHTMLwExploit): <>('!)/
```

FIG. 6 (CONTINUED)

```
#--------------------------------------------------
#    HTML attribute (Case #3b: Dynamic Exploit Choice Double Quote)
#--------------------------------------------------
<body  BGCOLOR="6ea261c8cf3d49c7fe1ab1a8fc2bfa22"></body>
Original Exploit (quote type is unknown):  ReplaceQuote
onload=ReplaceQuoteEvilExploit()ReplaceQuote notag=ReplaceQuote
Left String: <body  BGCOLOR="
Right String: "></body>
Left Characters: <="
Right Characters: "></>

XSS_char_test (XSS_char_test ExploitSyntaxPre): "
XSS_char_test (XSS_char_test ExploitSpecialCharacters): "=()
XSS_char_test (XSS_char_test_ExploitSyntaxFullHTML): <="()>/

Dynamically Created Exploit String (Using " ):   " onload="EvilExploit()"
notag="
Full HTML Syntax with Exploit (buildExploitAttribute): <body  BGCOLOR=" "
onload="EvilExploit()" notag=""></body>

XSS_char_test (XSS_char_test_ExploitSyntaxFullHTMLwExploit): ">=()</

#--------------------------------------------------
#    HTML attribute (Case #3c: Dynamic Exploit Choice Single Quote)
#--------------------------------------------------
<body  BGCOLOR='6ea261c8cf3d49c7fe1ab1a8fc2bfa22'></body>
Original Exploit (quote type is unknown):  ReplaceQuote
onload=ReplaceQuoteEvilExploit()ReplaceQuote notag=ReplaceQuote
Left String: <body  BGCOLOR='
Right String: '></body>
Left Characters: <='
Right Characters: '></>

XSS_char_test (XSS_char_test ExploitSyntaxPre): '
XSS_char_test (XSS_char_test ExploitSpecialCharacters): '=()
XSS_char_test (XSS_char_test_ExploitSyntaxFullHTML): <='()>/

Dynamically Created Exploit String (Using ' ):   ' onload='EvilExploit()'
notag='
Full HTML Syntax with Exploit (buildExploitAttribute): <body  BGCOLOR=' '
onload='EvilExploit()' notag=''></body>

XSS_char_test (XSS_char_test_ExploitSyntaxFullHTMLwExploit): '>=()</
root@dev-workstation:~/workspace/xssWarriorExploit#
```

FIG. 6 (CONTINUED)

METHODS FOR DETERMINING CROSS-SITE SCRIPTING AND RELATED VULNERABILITIES IN APPLICATIONS

CROSS-REFERENCE TO RELATED APPLICATIONS

This application claims the benefit of U.S. provisional application Ser. Nos. 62/126,412 filed Feb. 27, 2015, 62/029,625 filed Jul. 28, 2014 and 61/953,775 filed Mar. 15, 2014, each of which is hereby incorporated by reference in its entirety.

FIELD OF THE INVENTION

The invention relates to the field of testing applications for cross-site scripting vulnerabilities.

BACKGROUND OF THE INVENTION

Currently, cross-site scripting (XSS) detection tools and programs that check for XSS use signature (or "payload") based methods to determine if such vulnerabilities exist in the webpage of an application. What this means is that the tool will take a known signature/payload and use it to determine if XSS exists. For example,
 <scri-pt>alert(10)</scri-pt>
is a known test payload for XSS. Tools will append, replace or commingle this signature/payload to the parameter of a URL or in the GET/POST and as such:
 h-t-t-p-://vulnsite.-com/
  vulnscript.php?vuln=<script>alert(10)</script>
If the signature/payload is returned, the website source is then run through additional tests to determine if the application is deemed vulnerable. The signature-based steps include:
 Step 1: Find GET/POST URLs with parameters;
 Step 2: Append, replace or commingle parameters with signatures/payloads;
 Step 3: Make website request;
 Step 4: Run source code through browser rendering (e.g., with the Xenotix application) or analyze server response codes (e.g., with the wfuzz scanner) to determine if site is vulnerable; and
 Step 5: Report Findings.

A good example of this signature based method is found in the OWASP Xenotix XSS Exploit Framework. The Xenotix project claims "to have the world's 2nd largest XSS Payloads of about 4800-plus distinctive XSS Payloads for effective XSS vulnerability detection."

A second example comes from the security company Edge Security which develops and maintains wfuzz, an open source scanner which includes XSS checks. This tool also uses a signature/payload—they are called Injections in wfuzz—based method of discovering XSS injections.

However, there is a fundamental drawback to these conventional methods, namely, if the exact string does not work (reflect) in the test, the test will fail to detect the vulnerability in the website even though the vulnerability may, nevertheless, exist.

What is needed and provided by the present invention are new and improved methods for testing applications for XSS vulnerabilities that are neither based on nor limited by a compendium of XSS signature payloads.

SUMMARY OF THE INVENTION

One embodiment of the invention provides a computer-implemented method for testing an application, such as an interactive website, for cross-site scripting vulnerabilities that includes the steps of:

(a) for at least one field/parameter/URL of the application, submitting a request in which the field/parameter/URL contains a test slug consisting of one or more test characters, which may, for example, include one or more encoded (such as URL-encoded) or non-encoded (such as ASCII or HTML) special characters, between two default slugs each consisting of non-special characters;

(b) determining if the application returns (such as reflects) the test slug with the test characters transformed or non-transformed (e.g., encoded or non-encoded) in response to the request;

(c) recording in tangible computer memory the result of the determination made in step (b); and (d) repeating steps (a)-(c) for a plurality of test slugs including different test characters.

The method may be performed with all character sets, character types and encoding types, for the test slug, without respect to any pre-designation of a character as a special character.

The method may further include the steps of:

before steps (a)-(d), for at least one field/parameter/URL of the application, submitting a request in which the field/parameter/URL contains a default slug not having any special characters; and determining if the application returns (such as reflects) the default slug in response to the request, wherein if the application returns the default slug, the test slug used in step (a) consists of the test character(s) sandwiched between two strings of non-special characters the two strings being the same or different.

The process may be iterated for each field/parameter/URL/etc. detected in/provided by the application. URLs and parameters not previously known may but discovered in the testing process may be included in the testing and analysis. URLs and parameters may, for example, be generated by a software component, be discovered through implementing certain conditions such as forcing errors in an application, and/or may be imported from other applications. The method may culminate in the step of preparing a report such as a spread sheet or document identifying vulnerabilities detected by the method, which report may be stored in a tangible computer memory of a computer system.

A related embodiment of the invention provides a computer system configured to test an application for cross-site scripting and/or related vulnerabilities that includes:
 at least one processor;
 processor-accessible memory; and
 processor-executable computer instructions stored in the processor-accessible memory, said computer instructions configured to direct the processor to perform the steps any of the methods of the invention.

The computer system may further a network communication modules such as an Internet communication module under control of the at least processor, for example for communicating over a network such as the Internet with remote applications that are being tested according to the method(s) of the invention. For testing of "local" applications, a communications module may not be required since the interaction between the application being tested and the testing system may be implemented/simulated within the same computer system.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 1A illustrates a manner in which default slugs and test slugs may be employed according to the invention in a first scenario.

FIG. 1B exemplifies a modification of the results obtained in the first scenario in which a submitted special character is not reflected but, instead, other characters are returned.

FIG. 2A illustrates a manner in which default slugs and test slugs may be employed according to the invention in a second scenario.

FIG. 2B exemplifies a modification of the results obtained in the second scenario in which two submitted special characters are not reflected but, instead, other characters are returned.

FIG. 3A illustrates a manner in which default slugs and test slugs may be employed according to the invention in a third scenario.

FIG. 3B exemplifies a modification of the results obtained in the third scenario in which a submitted special character is not reflected but, instead, other characters are returned.

FIG. 4 shows sample processor-executable code (computer instructions, Python programming language) for generating a unique slug for each field found in an application.

FIG. 6 shows an exemplary report showing the parsing and exploit generation results obtained by the computer code presented in the Computer Program Listing Appendix.

DETAILED DESCRIPTION

Figure 5:
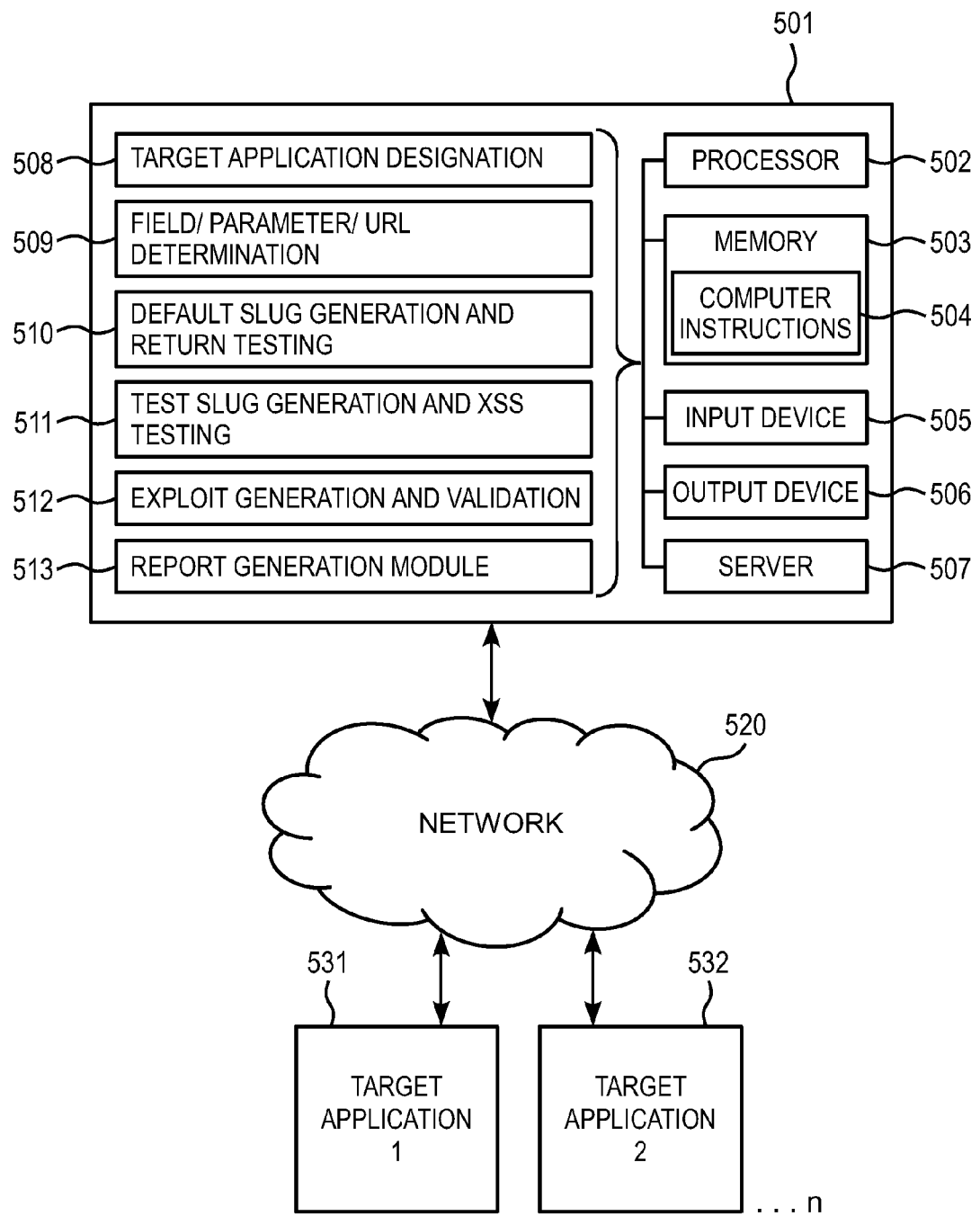
FIG. 5 shows a computer system embodiment of the invention configured to test remote target applications via a communications network.

The present invention provides new methods and systems for detecting XSS vulnerabilities including but not limited to reflected, in-memory, stored and DOM-based XSS vulnerabilities. Various embodiments of the invention use character determination, source code context, source code parsing, source code interpretation and character determination based on parsing and analyzing syntax (of HTML, XML, JSON, etc.) to determine if an application is vulnerable rather than conventional testing with signatures/payloads as in the above-described prior art methods. The methods of the present invention may be employed across different technologies—such as, but not limited to, ActiveX, Java, VBScript, Flash—to test where cross-site scripting attack vectors exist. The methods of the present invention may be employed as an alternative to and/or in addition to prior methods for detecting XSS vulnerabilities. Also provided by the invention are methods for creating exploits based on the results of the XSS vulnerability testing.

Various URLs and executable computer code are exemplified throughout this disclosure in explaining various aspects of the invention. In order to comply with the regulations prohibiting presentation of active links and executable computer code in patent specifications, the various URLs and code presented have been broken up in pertinent locations by the addition of hyphens. Those skilled in the art will readily recognize that the text so-modified refers to the corresponding unmodified text (without the hyphens).

Overview of Application Testing Methods

In order to find instances of XSS according to the invention, including without limitation Stored XSS, the methods and system of the invention track where the data goes into the application and where it comes out. This may be done by creating a unique slug (character string) for every field and submitting these slugs to the application. In one case the slug is an MD5 check sum but it could be any unique string identifying the field. If the application accepts the slug assigned to the field, the slug will either come out immediately (Reflected XSS), stay in memory and be displayed on another page (InMemory XSS/ReflectedStored XSS, hereafter referred to as InMemory) or stored in the database and be subsequently displayed either on the current page or a different page (Stored XSS), or in another process, such as email. It is also possible for the slug to be referenced in the DOM when returned (DOM XSS). It is possible for all of these conditions to occur separately, at once or in any combination thereof.

A spider (spidering application), one example of a software component, is not necessary if one is testing a specific page. The more thorough the test is desired or necessary, the more spidering is necessary. Spidering is the gathering of links via HTML/AJAX/etc. and then calling each link to see what data is returned. Entry points into the application (parameters of the application) may be found by spidering the website (HTML/AJAX/Etc.) in addition to known possible entry points such as HTTP headers including cookies or entry points discovered dynamically. In one method, fields may URL specific, not (global) by name. That is, the field "p" is a different parameter for the two URLs below:

h-t-t-p-://site.-com/1/?p=1 and h-t-t-p-://site.-com/2/?p=1

Spidering is just one technique that may be employed to obtain the urls and parameters of an application. Obtaining (determining) these fields in an application may be also performed by other methods such as, but not limited to, by using a piece of software known as a proxy in the art or "manually imported", e.g., by inspection, selection and copying of a URL. The obtained URLs/field/parameters may be stored in tangible processor-accessible memory in a data structure such as a database and retrieved as needed by a processor having access to the memory under the control of computer instructions (stored in tangible processor-accessible memory) that are configured to direct the processor to carry out the application testing method(s) and/or XSS testing method(s) of the invention. Spidering may be conducted as an unauthenticated, authenticated user or both. If spidering is conducted as two or more different authenticated users, it may be determined if the data submitted by one user is accessed by another user. Spidering may be performed with different users (user profiles) with different access levels, for example in a process of privilege escalation, thereby testing for attacks from one level of access against a different level of access or against the same level of access. For example, in this manner, it can be determined if an attack by a lower level user can be run against a user at a higher level and vice versa. If spidering is performed, spidering at different times in the process may lead to different levels of validation for discovering data loading. Spidering may be repeated at various points in the process of determining data entry points since the data loaded may create new URLs to discover. The slugs may then be submitted to those URLs (header, cookies, parameters, etc.), particular slugs being assigned to and submitted to their respective unique fields. The resulting output can be immediately checked (or later checked) for reflected values. Using the same session, one may spider again for slugs that may be in memory but not stored. Further, session information may then be cleared and spidering performed again to find the slugs stored in the application. Any session or combination thereof may be used to test for just Reflected or Stored XSS.

One or more or all of the following spidering methods may be used:
1. Spidering without authentication as same user (Reflected, DOM & InMemory/Slugs);
2. Spidering with authentication as same user (Reflected, DOM, InMemory & Stored Slugs); and
3. Spidering with authentication as more than 1 user (Reflected, DOM, InMemory & Stored Slugs)
   Spidering may be performed with one, two or more user profiles at once. It is not restricted to one or two at a time.

For spidering without authentication as same user (Reflected, DOM & InMemory Tokens), the method steps may, for example, include:
1. Spider website to get URLs test;
2. Perform data tracing and check each page return (Reflected & DOM); and
3. Re-spider to find submitted tokens (InMemory of server).

If the spidering examines reflected XSS or DOM-based XSS then a session cookie (token) is optional but with if spidering examines in-memory situations, the same-session token must be used when spidering. (DOM refers to memory of the browser/client computer, in-memory refers to memory, such as session variables, and/or the way session data is handled by the server/target application system for a given state.)

For spidering with authentication as same user (Reflected, DOM, InMemory & Stored Slugs), the method steps may, for example, include:
1. Authenticate and Save Cookie;
2. Spider website to get URLs test;
3. Perform data tracing and check each page return (Reflected & DOM);
4. Re-spider to find and save submitted slugs (InMemory);
5. Clear Cookies/Log out of application;
6. Re-Authenticate and Save Cookie; and
7. Re-Spider to find and save persistent/saved slugs (Stored).

For spidering with authentication as more than one user (Reflected, DOM, InMemory & Stored Slugs), the method steps may, for example, include:
1. Authenticate and Save Cookie for User 1;
2. Authenticate and Save Cookie for User 2;
3. Spider website to get URLs test as User 1;
4. Spider website to get URLs test as User 2;
5. Perform data tracing and check each page return as User 1 (Reflected & DOM);
6. Re-spider to find and save submitted slugs as User 1 (InMemory);
7. Re-spider to find and save submitted slugs as User 2 (InMemory);
8. Clear Cookies/Log out of application as User 1;
9. Clear Cookies/Log out of application as User 2;
10. Re-Authenticate and Save Cookie as User 1;
11. Re-Authenticate and Save Cookie as User 2;
12. Re-spider to find and save persistent/saved slugs as User 1 (Stored); and
13. Re-spider to find and save persistent/saved slugs as User 2 (Stored).

Various combinations of application parameters (URLs etc.) and their associated slugs may be generated by software components such as system plug-ins for attempted loading into the application to be tested. The generation of application parameters may include creating new combinations of parameters and associated values that may not be found by default on the website through techniques such as spidering. In one method, all application parameter loading techniques use the same slug for the field. In another method, each loading technique uses a unique slug for that field and that load method. The latter variation will help testing later on but is not a requirement. These processes are not fuzzing in the traditional sense. For example, in traditional fuzzing, it is usually the value of the parameter that changes in order to find a vulnerability. By contrast, in this step of the invention, the focus is on loading data into the application, and tracing it, to find potential XSS entry points. According to the present invention, one may change one or many values or none at all—and different combinations of parameters that differ in number and value from the originals may be used, for example, in an automated process, in order to determine which data will be accepted by the application and be reflected, in-memory, stored or referenced in the DOM. For example, one may submit:
   h-t-t-p-://site.-com/?parm1=[slug]&parm2=[slug]
   h-t-t-p-://site.-com/?parm1=[slug]
   h-t-t-p-://site.-com/?parm2=[slug]
   h-t-t-p-://site.-com/?parm1=[slug]&parm2=[blank]
   h-t-t-p-://site.-com/?parm1=[blank]&parm2=[slug]
   h-t-t-p-://site.-com/?parm1=[slug]&parm2=[original data]
   h-t-t-p-://site.-com/?parm1=[original data]&parm2=[slug]

These variations are not considered fuzzing in the art. In addition, the application may alter the values of the parameters based on known accepted values in order to create conditions which trigger the application to accept the test slug or display XSS behavior. URLs may, for example, be generated, discovered or imported from other applications. New URLs that may not be discoverable by spidering may be discoverable based on those tested, for example, by forcing an error to occur in the application. URL data may, for example, also be obtained from existing applications or user supplied data, such as zap, burp and URL lists.

A URL may or may not have parameters. Accordingly, slugs may also be placed in the URL itself rather than or in addition to being assigned to a parameter. For example, a slug may be placed in a URL as shown below:
   h-t-t-p-://vulnsite-.-com/[slug]/url1/
   h-t-t-p-://vulnsite-.-com/[slug]/url2/?parm=1234

Thus, default slugs may be loaded into a target application via parameters/fields/URLs, etc. and incidences in which the default slug has been returned (reflected, stored in-memory, in DOM etc.) may be detected and stored in the processor-accessible memory of the testing system including, for example, the context in which (where) the returned default slug occurs and the syntax in which it occurs, i.e., what specific characters surround the returned default slug. The computer systems and computer-implemented methods of the invention may automatically parse out and store in computer memory the context and/or syntax information for the returned default slugs, for example, using one of the following methods:

A first method including the following steps may be used:
1. HTML with returned default slug is found
2. The HTML and slug are used by the regex object/function to determine which characters are needed to pass through the filter to create executable HTML code (i.e., what is missing)
3. Regex is used to parse the HTML syntax and determine the characters needed and the order. While different RegExs may be used in this case it may be: matches=re.findall('<.*?>', HTMLfull) where HTMLfull is a variable.

4. Finding/determining just the characters needed to be in front of the exploit, all characters in the HTML (including characters after exploit), and/or additional characters that may be added or needed to create syntactically correct HTML (a putative exploit).
5. (XSS Testing—see next section) The characters are then tested by loading test slugs that present the test characters between two default slugs.

Assuming the characters necessary to create executable code pass through any filter and are returned, an exploit string can be dynamically built. In this manner, the exploit string can be built based on characters that pass through the filter, not blindly. A person skilled in the art will recognize that using RegEx is one method to select characters and other techniques may also be used.

A second method, including the following steps may be used:
1. HTML with returned default slug is found
2. Context is used to determine which exploit to run
3. The HTML & slug and/or exploit are used by the regex object/function to determine which characters are needed to pass through the filter
4. Regex is used to parse the HTML syntax and determine the characters needed and the order. While different RegExs may be used in the case it's: matches=re.findall ('<.*?>', HTMLfull) where HTMLfull is a variable.
5. Finding/determining just the characters needed to be in front of the exploit, all characters in the HTML (including characters after exploit), and/or additional characters that may be added or needed by the exploit
6. (XSS Testing—see next section) The characters may then tested by loading test slugs that present the test characters between two default slugs.

Assuming the characters necessary to create executable code pass through any filter and are returned, an exploit string can be dynamically built. In this manner, the exploit string can be built based on characters that pass through the filter, not blindly. A person skilled in the art will recognize that using RegEx is one method to select characters and other techniques may also be used.

The Computer Program Listing Appendix presented at the end of this disclosure exemplifies computer code configured to parse out the syntax (such as special characters) surrounding a returned default slug and determine which characters may be added in order to build an executable piece of code, i.e., an exploit. In the exemplified computer code, different algorithms are used to build different exploit strings. FIG. 6 shows an exemplary report showing the parsing and exploit generation results obtained by the program.

Overview of XSS Testing Method

Once all default slugs are mapped—where they entered and exit the application—one can then start testing to see which characters (or other data such as strings and exploits) pass through the application filter. The same method used to load the default slug into the application may be used to test which different characters (and combinations thereof and subsequently created exploits based thereon) can pass the application's filter. The method(s) and parameters used to load the slug into the application (in the application testing steps) may be stored in computer accessible memory, for example, in a data structure, such as database, such as a relational database, so that a computer processor under direction of computer instructions stored in tangible computer-accessible memory can retrieve that data, modify it to create tests slugs that include additional characters such as special characters and submit the modified slugs to the application being tested. As explained in further detail below, the test slugs for a field/parameter may consist of the character(s) to be tested in the middle of (sandwiched by) a first slug and a second slug, which slugs were found to be returned for the given field/parameter in the application testing phase. The first slug and second slug may be identical or non-identical strings.

Since the test slugs created encompass unique strings, one can test not only which specific characters pass the filter but also what strings of characters pass the filter. This aspect of the invention is advantageous for testing unique exploits for a particular piece of browser-interpretable code such as HTML or a scripting language such as JavaScript, and VBscript or internal data structure such as for Document Object Model (DOM)-based XSS.

One method that may be used to test for slugs and exploits is to use XPATH to parse the HTML looking for the specific test slugs (unique strings). Other parsing methods, including known parsers and/or custom developed functions, may also be used for a given type of data or code, such as HTML, XML, JSON.

As the returned slugs are collected/discovered, the context of where the slug is returned (exists)—for example Script, Attribute, text, comments, etc.—is determined and recorded in memory This information may be used to optimize the XSS testing since, at least in some cases, it can be used to minimize the number of characters or strings e.g., pieces of code such as HTML or scripting language—that need to tested instead of testing all of them. In general, the context in which a returned slug is seen including, for example, as observed via parsing and analyzing its occurrence in syntax situations (of HTML, XML, JSON, etc.) may be determined and recorded in memory.

In one variation, the relevant pieces of code or data, such as HTML, XML, JavaScript, VBscript, JSON, DOM information etc., are recorded and/or saved, as the returned slugs are found, so that they can be provided in a report and/or referred to later for example, in order to create and test exploits based on the information. Once it is determined the where the test slug occurs in the code or data, the part containing the slug may be parsed to determine which characters pass through the filter—for a given piece of the code or data. It is also possible that unique strings—such as "script" or "<script"—will be rejected even though each character can pass through the filter, and this determination may be made using the methods of the invention. As described in detail below, a method of building and testing unique XSS strings may be applied in these situations.

Overview of Exploit Creation Methods

Once the characters and/or strings that pass through the filter of the tested application are determined using the XSS testing methods of the invention, a determination of which exploits will work for the Javascript/Vbscript, piece of HTML, etc. may be made based on that information.

As explained in further detail below, variations of different exploits may be created based on the results obtained from the XSS character and string testing. The methods of the invention are able to generate exploits de novo without any guidance provided by knowledge of known exploits. However, since the formats of many typical exploits are known in the art, this information may also be used, in addition or alternatively, as a foundation for generating the exploits. In one variation, this information can be stored/recorded ahead of time. In another variation, the exploit must be created dynamically based on the specific way the application generates its output during the XSS testing. The XSS testing method provides information that is helpful for generating both exploit strings that are based on/resemble known exploits and those that are not. While the method of the invention is able to (and may be used to) generate all exploits dynamically, it is sometimes helpful to store and/or refer to known issues for optimization purposes. Once a working exploit is created through these methods, it may be used in additional programs for testing and validation, which may include methods such as but not limited to in and out of band callbacks, and processes such as but not limited to DOM abstraction. In addition, the code may be analyzed in an in-sandbox and/or out-of-sandbox manner.

Various aspects and embodiments of the invention are further described herein below.

In one embodiment, the invention provides computer-implemented methods and computer systems for testing a target application for cross-site scripting and related vulnerabilities that includes any one of combination of or all of the following component methods or computer system modules configured to perform the methods:

1. Determining fields/parameters/URLs of target application;
2. Slug assignment;
3. XSS testing methods;
4. Transformation/non-transformation determination; and
5. Exploit generation methods.

The methods of the invention may further include generating a vulnerability report based on the results of the testing and the computer systems of the invention may further include a report generation module for generating such a report which may be output on one or more output devices such as a display, a printer or an email, web or file server.

The following XSS test methods may be used according to the invention:

1. Brute force (testing every possible character/string between default slugs);
2. Character by context;
3. Character by context and tag (external Javascript); and
4. Character by parsing and analyzing HTML/XML/JSON/etc syntax
5. Character by context and syntax The invention may also include character transformation/non-transformation determination steps. These methods determine how the characters, strings or exploits are transformed by the application that is tested. For example, does the application transform > to >.

In one embodiment, the invention includes the steps of:

1. Finding GET/POST URLs with parameters
2. Replacing parameters with a Default Slug value (such as the regular character string 9b1e3f)
3. Making a website request (with the parameter replaced with default slug 9b1e3f)
4. Examining the returned Source code to determine if Default Slug was returned
5. If the default slug was not returned, the parameter is not vulnerable to XSS
6. If the slug is returned, determining the context and/or syntax of where the slug is returned, e.g., where and how in the source code it occurs
7. From the context and/or syntax, determining the checks to be performed.
8. Instead of checking signatures, testing if specific characters (the "test characters") such as special characters are able to get though the web application filter for the context where the slug is returned.
9. Padding the test character(s) such as XSS special characters, between two default slug values (which could be already generated), for example, 9b1e3f;9b1e3f, to create a "new special character slug".
10. Replacing the desired parameter to be tested with the new special character slug.
11. Requesting webpages over and over with a new special character slug test for each special character (or combination thereof) to be tested. Sometimes, the test may be optimized or streamlined by reducing the size of the set of special characters (or combinations thereof) to be tested because certain characters are only needed or relevant in certain contexts but not others and/or syntax parsing reveals which select characters need to be tested.
12. For each special character slug, examining the source to determine if the entire slug is returned (such as 9b1e3f; 9b1e3f); if it is we know that we can get the special character (or combination thereof) through the filter, otherwise the character is filtered.
13. Based on the characters passed through the filter and the context of the slug, determining if the website is vulnerable to XSS or not and, importantly, characterizing the vulnerabilities that may be present.

Further testing may be performed by parsing the source where the original slug returned and determining the exact characters needed to be returned by the test character-containing (such as special character-containing) slug. If all the characters needed are returned for a particular context/syntax it has been determined with near certainty that a vulnerability exists.

Since the method provides a determination of which characters are needed to write an exploit to take advantage of the vulnerability, additional automated tests may be conducted—such as filter testing with additional slugged strings, automated signature/payload/injection/exploit writing and running the source code through browser rendering—to further accurately determine the true risk that is present. Sandboxing, may, for example, be used for validation.

The method looks for and characterizes reflected values—that is, slug data that is submitted to an application and is returned back. Accordingly, in one implementation, the method may begin by first determining if the application will return back data submitted to it (e.g., in a webpage) in the first place. If so, the location of where the data is returned in the webpage may be determined and recorded by the application (for example, recorded in a data structure such as a database in the processor-accessible memory of the testing system). In this manner the context of reflected data is determined. Reflected data may occur in multiple spots at the same time and different further tests may need to be run for each context. From this context-based analysis, it is determined where the vulnerabilities may exist in the application and where to run tests specific to these contexts. Each context has specific characters which if returned constitute the core logical component of the vulnerability. For example, if the reflected data winds up in the context of JavaScript tags, the application may be vulnerable if specific characters are passed through the filter and are returned to us. Even within the context of the JavaScript tags, we may find that certain characters are needed but not others. These characters may be different than those needed if the reflected data is returned in the HTML component of a webpage. In contrast to the present invention, signature-based methods are severely limited because they cannot account for each situation in view of the high degree of variation that is possible. The methods of the present invention inquire into vastly more, if not all, possibilities and, therefore, are more accurate. Furthermore, once it is determined according to the methods of the invention which characters will reflect (getting through a filter), the invention may include further steps of dynamically building and testing for all strings that will execute XSS and bypass the filter.

These context and/or syntax tests determine which special characters returned indicate a vulnerability. Specific analysis of the context and/or HTML/XML/JSON/etc. syntax can determine which exact characters are needed to be returned to make the site vulnerable to XSS. By testing which characters are returned, it is determined which pass through the filter. If the application returns certain special characters submitted within a specific context and/or HTML/XML/JSON/etc. syntax, one will know there is a vulnerability in the application. Using this method, it is not necessary to know ahead of time which signature to use because every vulnerability instance can be uniquely tested to determine if a XSS vulnerability exists in the application.

Special characters may include those recognized in the art, such as those shown in Table 1.

TABLE 1

| Special Character | URL-Encoded Version | Character Name | Known XSS Character? |
|---|---|---|---|
| ~ | %7E | Tilde | |
| ! | %21 | Exclamation point | |
| @ | %40 | At sign | |
| # | %23 | Pound sign | |
| $ | %24 | Dollar sign | |
| % | %25 | Percent sign | |
| ^ | %5E | Exponential sign (hat) | |
| & | %26 | Ampersand | Yes |
| * | %2A | Asterisk | |
| ( | %28 | Open parenthesis | |
| ) | %29 | Closed parenthesis | |
| _ | %5F | Underscore | |
| + | %2B | Plus sign | |
| ' | %91 | Single quote | |
| - | %2D | Minus sign | |
| = | %3D | Equal sign | |
| [ | %5B | Left bracket | |
| ] | %5D | Right bracket | |
| \ | %5C | Back slash | |
| { | %7B | Left brace | |
| } | %7D | Right brace | |
| \| | %7C | Vertical Bar | |
| ; | %3B | Semicolon | |
| : | %3A | Colon | |
| ' | %27 | Single quotation mark | Yes |
| " | %22 | Double quotation mark | Yes |
| , | %2C | Comma | |
| . | %2E | Period | |
| / | %2F | Forward slash | Yes |
| < | %3C | Less than sign | Yes |
| > | %3E | Greater than sign | Yes |
| ? | %3F | Question mark | |

The special characters indicated as known XSS characters in the table are those most commonly needed for XSS but they are not necessarily required. Different contexts and/or HTML/XML/JSON/etc. syntax for the testing, such as different type of fields and parameters, may call for different special characters or combinations thereof to be tested. For example, in a normal case, one might need three characters such as < > " whereas in another context one may need different characters such as " ) { and }. Advantageously, the testing methods of the present invention illuminate which characters are associated with and give rise to vulnerabilities without predicating the analysis on assumptions.

In one example of how the invention can provide particularized information about vulnerabilities and application filters, there may be cases in which < is reflected and > is reflected but <script> or < followed by any character is not reflected. The invention characterizes these situations and further tests may be performed according to invention to determine the additional filters at work.

Implementations with Encoded and Non-Encoded Characters

The method of the invention may also test the application being evaluated for potential vulnerabilities to see if it automatically converts submitted three character codes for special characters ("encoded characters") into the special character so that the special characters themselves (non-encoded) are reflected or the three character code is reflected. For example, in a process embodying this aspect, a first step may include submitting as a field/parameter a string such as a default slug with encoded regular (non-special) characters only (%39%62%31%65%33%66) and determining whether what may be reflected remains encoded or is converted to the non-encoded characters (9b1e3f). If is found that the application, such as server application, does not convert encoded special characters, the remaining steps of the process can proceed as described before by submitting padded slugs having non-encoded special characters and determining if and where they are reflected. On the other hand, if it is found that the application, such as server application, does convert encoded special characters to return the corresponding non-encoded characters, the process may proceed by submitting padded slugs having the encoded characters (such as 9b1e3f%279b1e3f in which %27 is the URL encoding for the non-encoded single quotation mark character), with or without also separately submitting padded slugs having the non-encoded characters, and in each case determining if and where they are reflected. While the first step will help the application make decisions later on, it may be advantageous to test characters and strings as both the encoded and non-encoded independently of the first step.

Use of Unique Slugs for Each Field/Parameter/URL

In one variation of the invention, unique data slugs can be used to mark where the data enters (which field/parameter) in the application and where it leaves the application (outputted HTML, JavaScript, etc.). Thus, a different unique slug may be used for each field/parameter in an application being tested for vulnerabilities according to the invention. These unique slugs may be strings that may be composed of characters (e.g., TESTSLUG), encoded data, hashes (e.g., d8e8fca2dc0f896fd7cb4cb0031ba249) or numbers (e.g., 9876543210). The slug may be any length that causes a unique pattern that may be recognized by the testing application. Examples of where the application could store the slug could be in memory, defined data structure, on disc or in a database. Thus, according to the invention, unique data slugs may be used for each different field/parameter presented by an application so that reflection(s) resulting from particular field/parameters can be traced and tracked and correctly attributed. This method, even employed alone without special characters (one embodiment of the invention), provides very valuable information. All filters may be further tested up and down the stack—for example, the application filter and the database filter—for specific characters such as the special characters, between two slugs. In this manner, the returned slug behavior and XSS vulnerabilities associated with each data entry point can be individually determined and a record made thereof.

It should be understood that the invention may be employed in various different contexts and situations in which data (including slugs) can be "reflected/outputted" directly or indirectly and immediately or in a delayed fashion and, thus, generally whenever data is submitted to an application and will be later outputted to another application (such as a web browser on a client device) either in modified or unmodified form. For example, the invention may be employed in relation to script tags, reference tags, direct html, DOM, CSS, stored data/stored XSS, in-memory xss, etc. It may, for example, be employed with Stored XSS (a/k/a Persistent or Type I), with Reflected XSS (a/k/a Non-Persistent or Type II) and with DOM-based XSS (a/k/a Type-0). It may also be employed in situations of InMemory XSS. Thus, for example, in one scenario, the methods and systems of the invention may be employed to test for vulnerabilities in a situation in which a web browser of a user makes requests to a web server which immediately returns data to the user's browser (and may not save any field/parameter data that may be received from the user (user device) and reflected back to the user). The methods and system of the invention may also be used to test whether malicious code can be inserted from a first user's data when they use their web browser (or web-enabled application generally) to enter data to be saved in a database for later download by themselves or by other web users, such as in the case of updating profile data/fields on a social network profile page of the user, such as a Facebook profile page, which data is saved in a database by the social network to be later served to (downloaded by) users of the social network. The methods and systems of the invention may be also employed to test situations where the data submitted is inputted into the application and returns on a different page then where submitted due to it being stored in the memory of the server for the session (InMemory XSS). The methods and systems of invention may also be employed to test for DOM-based XSS vulnerabilities involving data that is not submitted to a server but remains in local/client/browser memory and is referenced in or by the DOM.

FIG. 1A illustrates the manner in which default and test slugs may be employed in a first scenario, an HTML attribute tag, in which the href parameter of a link (note double quotation marks surrounding parameter) is first replaced by a default slug 9b1e3f (which passes, i.e., is reflected), then by a sequence of padded test slugs containing the non-encoded special characters < > and / each of which passes (is reflected) in this example. From such a test, it is determined that the application is vulnerable with respect to the special characters < > and / for the context of the first scenario. Finally, an example of "Attacker's Code" based on the test results and for which the application is susceptible is shown. FIG. 1B exemplifies a modification of the results obtained in the first scenario in which a submitted special character > is not reflected but, instead, transformed into other characters (the HTML multi-character code therefore) are returned.

FIG. 2A illustrates the manner in which default and test slugs may be employed in a second scenario, an HTML attribute tag that includes malformed HTML, i.e. single quotation marks surrounding the parameter rather than double quotes (as shown in FIG. 1A), in which the href parameter of a link is first replaced by a default slug 9b1e3f (which passes, i.e., is reflected), then by a sequence of padded test slugs containing the non-encoded special characters < > and / each of which passes (is reflected) in this example. From such a test, it is determined that the application is vulnerable with respect to the special characters < > and / for the context of the first scenario. Finally, an example of "Attacker's Code" based on the test results and for which the application is susceptible is shown. FIG. 2B exemplifies a modification of the results obtained in the second scenario in which two submitted special characters ' and > are not reflected but, instead, other characters (the HTML multi-character code therefor) are returned.

FIG. 3A illustrates the manner in which default and test slugs may be employed in a third scenario, in the HTML body with the subject parameter bounded by > and < and being first replaced by a default slug 9b1e3f and then by a sequence of padded test slugs containing the non-encoded special characters < > and / each of the padded test slugs passing (being reflected) in this example. Finally, an example of "Attacker's Code" based on the test results and for which the application is susceptible is shown. FIG. 3B exemplifies a modification of the results obtained in the first scenario in which a submitted special character > is not reflected but, instead, other characters (the HTML multi-character code therefor) are returned.

EXAMPLES

Generation, Assignment and Submission of Unique Slugs for Different Application Parameters/Fields The following three slug assignment methods may, for example, be used according to the invention:
1. one field;
2. algorithm-based (field same slug); and
3. algorithm-based (same field name different slug by URL).

One Field Slug Assignment

The generation, assignment and submission of unique slugs to each of an application's parameters/fields may be performed according to the following seven step process, exemplified in the following examples:
  Step 1: Get URL.
  Step 2: Get URL parameters and values
  Step 3: Save URL parameters and values
  Step 4: For each parameter, generate md5checksum or modified length md5checksum
  Step 5: Assign the md5checksum or modified length md5checksum to the parameter
  Step 6: Save assignment
  Step 7: Load slug into application through different/variety of GET, POST, Cookie, HEADER methods (whatever entry point(s) is/are applicable).
  GET Method Example 1
  Step 1:
h-t-t-p-://192.168.56.103/testScripts/reflect.
  php?HTMLtext=HTML2ndtext&HTMLtext=
  HTMLtext&HTMLa ttDQ=HTMLattDQ&HTMLattSQ=
HTMLattSQ&scriptattr=scriptattr&scripttag=scripttag
  Steps 2 and 3:
HTMLtext=HTML2ndtext
  Step 4:
2f6b4e8
  Steps 5 and 6:
HTMLtext=2f6b4e8
  Step 7:
h-t-t-p-://192.168.56.103/testScripts/reflect.
  php?HTMLattDQ=2f6b4e8&HTMLattSQ=
  HTMLattSQ&HTMLt    ext=HTML2ndtext&scriptattr=
  scriptattr&scripttag=scripttag
  GET Method Example 2
  Step 1:
h-t-t-p-://192.168.56.103/testScripts/
  reflect.php?HTMLtext=HTML2ndtext&HTMLtext=
  HTMLtext&HTMLa ttDQ=HTMLattDQ&HTMLattSQ=
  HTMLattSQ&scriptattr=scriptattr&scripttag=scripttag
  Step 2 and 3:
HTMLattSQ=HTMLattSQ
  Step 4:
78752ef
  Steps 5 and 6:
HTMLattSQ=78752ef Step 7:
h-t-t-p-://192.168.56.103/testScripts/
reflect.php?HTMLattSQ=78752ef&HTMLattDQ=
HTMLattDQ&HTMLt ext=HTML2ndtext&scriptattr=
scriptattr&scripttag=scripttag POST Method Example (Parameters are Parsed from HTML Form Tags)

Step 1:
h-t-t-p-://192.168.56.103/testScripts/reflect.php

Steps 2 and 3:
HTMLattSQ=HTMLattSQ

Step 4:
78752ef

Steps 5 and 6:
HTMLattSQ=78752ef

Step 7:
h-t-t-p-://192.168.56.103/testScripts/reflect.php {u'post-data': {u'HTMLattDQ': u'', u'HTMLtext': u'', u'scripttag': u'', u'scriptattr': u'', u'HTMLattSQ': u'78752ef'}}

For the following original URL, examples are provided thereafter of URL-tested (URL-slugged versions) generated and submitted.

Original URL: h-t-t-p-://192.168.56.103/testScripts/
reflect.php?HTMLtext=HTML2ndtext&HTMLtext=
HTMLtext&HTMLa ttDQ=HTMLattDQ&HTMLattSQ=
HTMLattSQ&scriptattr=scriptattr&scripttag=scripttag URL Tested (URL-slugged) 1: h-t-t-p-://192.168.56.103/
testScripts/reflect.php?HTMLattDQ=
2f6b4e8&HTMLattSQ=HTMLattSQ&HTMLt ext=
HTML2ndtext&scriptattr=scriptattr&scripttag=scripttag URL Tested (URL-slugged) 2: h-t-t-p-://192.168.56.103/
testScripts/reflect.php?HTMLattSQ=
78752ef&HTMLattDQ=HTMLattDQ&HTMLt ext=
HTML2ndtext&scriptattr=scriptattr&scripttag=scripttag URL Tested (URL-slugged) 3: h-t-t-p-://192.168.56.103/
testScripts/reflect.php?scriptattr=
4a05a46&HTMLattDQ=HTMLattDQ&HTMLattS Q=
HTMLattSQ&HTMLtext=HTML2ndtext&scripttag=
scripttag URL Tested (URL-slugged) 4: h-t-t-p-://192.168.56.103/
testScripts/reflect.php?scriptattr=
4a05a46&HTMLattDQ=HTMLattDQ&HTMLattS Q=
HTMLattSQ&HTMLtext=HTML2ndtext&scripttag=
scripttag URL Tested (URL-slugged) 5: h-t-t-p-://192.168.56.103/
testScripts/reflect.php?scripttag=
eed97cd&HTMLattDQ=HTMLattDQ&HTMLattS
Q=HTMLattSQ&HTMLtext=HTML2ndtext&scriptattr=
scriptattr The following example shows a URL that could be obtained by spidering, the associated POST URL and the data to submit to the POST URL.

. . . URL Spidered: h-t-t-p-://192.168.56.103/testScripts/
reflect.php?HTMLtext=HTML2ndtext&HTMLtext=
HTMLtext&HTMLa ttDQ=HTMLattDQ&HTMLattSQ=
HTMLattSQ&scriptattr=scriptattr&scripttag=scripttag . . . URL POSTed (form method): h-t-t-p-://
192.168.56.103/testScripts/reflect.php . . . Data POSTed 1: {u'post-data': {u'HTMLattDQ': u'', u'HTMLtext': u'', u'scripttag': u'', u'scriptattr': u'', u'HTMLattSQ': u'78752ef'}}

. . . Data POSTed 2: {u'post-data': {u'HTMLattDQ': u'', u'HTMLtext': u'26292b5', u'scripttag': u'', u'scriptattr': u'', u'HTMLattSQ': u''}}

. . . Data POSTed 3: {u'post-data': {u'HTMLattDQ': u'', u'HTMLtext': u'', u'scripttag': u'', u'scriptattr': u'4a05a46', u'HTMLattSQ': a''}}

. . . Data POSTed 4: {u'post-data': {u'HTMLattDQ': u'', u'scripttag': u'eed97cd', u'HTMLtext': u'', u'scriptattr': u'', u'HTMLattSQ': u''}}

. . . Data POSTed 5: {u'post-data': {u'HTMLattDQ': u'2f6b4e8', u'HTMLtext': u'', u'scripttag': u'', u'scriptattr': u'', u'HTMLattSQ': u''}}

FIG. 4 shows exemplary notated computer code (JSON in Python programming language) for the generation of a unique slug for each parameter/field of a URL. The code references a database in which all slugs are recorded and checks that there are no duplicates assigned (so that the slug assigned to each field/parameter in the application will be unique).

Algorithmic Slug Assignment (Field Same Slug)

The generation, assignment and submission of unique slugs to each of an application's parameters/fields may be performed according to the following seven step process, exemplified in the following examples:

Step 1: Get URL.
Step 2: Get URL parameters and values
Step 3: Save URL parameters and values
Step 4: For each URL, generate the parameters to be submitted to application by application of algorithm (single, tree, alternating parameters, etc.)
Step 5: For each parameter, generate md5checksum or modified length md5checksum
Step 6: Assign the md5checksum or modified length md5checksum to the parameter
Step 7: Save assignment
Step 8: Load slug into application through different/variety of GET, POST, Cookie, HEADER methods (whatever entry point(s) is/are applicable).

The generation of the URL parameters and assignment of slug may, for example, happen at the same time (e.g., steps 4, 5 and 6).

Algorithmic Slug Assignment (Same Field Name Different Slug by URL)

The generation, assignment and submission of unique slugs to each of an application's parameters/fields/URLs may be performed according to the following seven step process, exemplified in the following examples:

Step 1: Get URL.
Step 2: Get URL parameters and values
Step 3: Save URL parameters and values
Step 4: For each URL, generate the parameters to be submitted to application by algorithm (single, tree, alternating parameters, etc.)
Step 5: For each different URL parameter variation, generate md5checksum or modified length md5checksum even if field has the same name
Step 6: Assign the md5checksum or modified length md5checksum to the parameter
Step 7: Save assignment
Step 8: Load slug into application through different/variety of GET, POST, Cookie, HEADER methods (whatever entry point(s) is/are applicable).

The generation of the URL parameters and assignment of slug may happen at the same time (e.g., steps 4, 5 and 6).

EXAMPLE

Transform Compare Method

The following example illustrates the application of a method to determine how the application transforms characters from one input into a different output using a default slug 9876543210:

1. Sandwich character, string or payload, (e.g. <) between two slugs (9876543210<9876543210)
2. Submit data to the application
3. Search for original submission (9876543210<987654321)
4. If not found search for slug: 9876543210
5. If slug found determine if there is a slug that soon follows it
6. Parse/record/save entire character(s)/string between two slugs
7. Alternatively, parse from start of one slug though the end of the second capturing the slug-transformation-slug and then remove the two slugs on both sides;
6. If so, note/record/save that the character transforms from <into > (9876543210>9876543210)

Generation of Exploits Based on XSS Testing Results

The results of the XSS testing of an application may be used to generate exploits for which the application is vulnerable. The slug may be used to parse or interpret the HTML or Javascript/VBscript in order to create new syntactically sound HTML or JavaScript. Various methods such as XPATH may be used to do so. For example, where 'A' represents the slug value:

//*[@*[contains(.,'A')] or text( )[contains(.,'A')]]

RegEx may also be used. It is important to note that the slug allows the application to break apart the code/data, such as HTML, Javascript, VBscript, etc., so that its components can be known. Once the components of the code/data are known, this information can be used to write an exploit.

The order of steps in the methods of the invention can have some flexibility. In one method (not shown below), one can find the slug, determine the elements and test only for the characters needed to get an exploit to work. For example, under normal conditions, if one finds the string <a href=" [slug]"></a> we know that if a double quotation mark (") does not pass through the filter (or is transformed into strings such as \" or >) into the section of code that contains the slug, the exploit will fail. In this case, the HTML, script, etc may be analyzed first before the XSS test method is performed.

Whole Payload Method of Exploit Generation

A first method including the following steps may be used in the generation of an exploit and is exemplified with respect to HTML below:

Step 1: Find Slug (e.g., MD5 CheckSum or part thereof) in HTML;
Step 2: Use XSS Test Method to determine characters that pass through filter;
Step 3: Check if exploit string passes through filter;
Step 4: Parse HTML to determine where Slug occurs;
Step 5: Use characters found to make syntactically correct HTML and see if passes through filter; and
Step 6: Remove Slug and Save Exploit
Store Signature XSS String: <scri-pt>alert('xss')</scri-pt> in computer memory, and optionally a generate report including the exploit.

Case 1 Example:
md5sum=5a105e8b9d40e1329780d62ea2265d8a

Step 1:
<a href="http://www.google.com">5a105e8b9d40e1329780d62ea2265d8a</a>

Step 2:
<a href="h-t-t-p-://www.google.-com">5a105e8b9d40e1329780d62ea2265d8a<5a105e8b9d40e1329780d62ea2265d8a</a>
<a href="h-t-t-p-://www.google.-com">5a105e8b9d40e1329780d62ea2265d8a>5a105e8b9d40e1329780d62ea2265d8a</a>
<a href="h-t-t-p-://www.google.-com">5a105e8b9d40e1329780d62ea2265d8a/5a105e8b9d40e1329780d62ea2265d8a</a>
<a href="h-t-t-p-://www.google.-com">5a105e8b9d40e1329780d62ea2265d8a(5a105e8b9d40e1329780d62ea2265d8a</a>
<a href="h-t-t-p-://www.google.-com">5a105e8b9d40e1329780d62ea2265d8a'5a105e-8b9d40e1329780d62ea2265d8a</a>
<a href="h-t-t-p-://www.google.-com">5a105e8b9d40e1329780d62ea2265d8a)5a105e8b9d40e1329780d62ea2265d8a</a>

Step 3:
<a href="h-t-t-p-://www.google.-com">5a105e8b9d40e1329780d62ea2265d8a<script>alert('xss')</script>5a105e8b9d40e1329780d62ea2265d8a</a>

Step 4:
(Part 1)<a hre"h-t-t-p-://www.google.-com">
(Part 2)</a>

Step 5:
<a href="h-t-t-p-://www.google.-com">5a105e8b9d40e1329780d62ea2265d8a</a><scri-pt>alert('xss')</scri-pt>5a105e8b9d40e1329780d62ea2265d8a<a></a>

Step 6:
<a href="h-t-t-p-://www.google.-com"></a><scri-pt>alert('xss')</scri-pt><a></a>

Case 2 Example
md5=ad0234829205b9033196ba818f7a872b

Step 1:
<a href="ad0234829205b9033196ba818f7a872b">Link Text</a>

Step 2:
<a href="ad0234829205b9033196ba818f7a872b"-ad0234829205b9033196ba818f7a872b">Link Text</a>
<a href="ad0234829205b9033196ba818f7a872b-<ad0234829205b9033196ba818f7a872b">Link Text</a>
<a href="ad0234829205b9033196ba818f7a872b>-ad0234829205b9033196ba818f7a872b">Link Text</a>
<a href="ad0234829205b9033196ba818f7a872b/ad0234829205b9033196ba818f7a872b">Link Text</a>
<a href="ad0234829205b9033196ba818f7a872b(ad0234829205b9033196ba818f7a872b">Link Text</a>
<a href="ad0234829205b9033196ba818f7a872b)ad0234829205b9033196ba818f7a872b">Link Text</a>
<a href="ad0234829205b9033196ba-818f7a872b'ad0234829205b9033196ba818f7a872b">Link Text</a>

Step 3:
<a href="ad0234829205b9033196ba818f7a872b<scri-pt>alert('xss')</scri-pt>ad0234829205b9033196ba818f7a872b">Link Text</a>

Step 4:
(part 1) <a href="
(part 2) ">Link Text</a>
//"></a><scri-pt>alert('xss')</scri-pt><a href="

Step 5:
<a href="ad0234829205b9033196ba818f7a872b"></a><scri-pt>alert('xss')</scri-pt><a href="ad0234829205b9033196ba818f7a872b">Link Text</a>

Step 6:
<a href=" "></a><scri-pt>alert('xss')</scri-pt>
<a href=" ">Link Text</a>

A variation of the first method including the following steps may also be used in the generation of an exploit and is exemplified with respect to HTML below:

Step 1: Find Slug in HTML
Step 2: Parse HTML to determine where CheckSum exists: syntax check
Step 3: Determine characters needed to pass through filter based on syntax of returned data (HTML/JSON/XML/etc.)
Step 4: Use XSS Test Method to determine characters that pass through filter
Step 5: If characters pass through filter, build exploit string based on characters and context and then check if exploit string passes through filter
Step 6: (optional) Exploit string can be out of band callback for extra validation
Step 7: Remove MD5 Check Sum and Save Exploit Case 3 Example (Variation of First Exploit Generation Method)
md5=ad0234829205b9033196ba818f7a872b
Step 1:
<a href="ad0234829205b9033196ba818f7a872b">Link Text</a>
Step 2:
(part 1)<a href="
(part 2) ">Link Text</a>
"></a><scri-pt>alert('xss')</scri-pt><a href="
Step 3:
<a href="ad0234829205b9033196ba818f7a872b"ad0234829205b9033196ba818f7a872b">Link Text</a>
<a href="ad0234829205b9033196ba818f7a872b-<ad0234829205b9033196ba818f7a872b">Link Text</a>
<a href="ad0234829205b9033196ba818f7a872b>ad0234829205b9033196ba818f7a872b">Link Text</a>
<a href="ad0234829205b9033196ba818f7a872b/ad0234829205b9033196ba818f7a872b">Link Text</a>
<a href="ad0234829205b9033196ba818f7a872b(ad0234829205b9033196ba818f7a872b">Link Text</a>
<a href="ad0234829205b9033196ba818f7a872b)ad0234829205b9033196ba818f7a872b">Link Text</a>
<a href="ad0234829205b9033196ba-818f7a872b'ad0234829205b9033196ba818f7a872b">Link Text</a>
Step 4:
<a href="ad0234829205b9033196ba818f7a872b<scri-pt>alert('xss')</scri-pt>ad0234829205b9033196ba818f7a872b">Link Text</a>
Step 5:
<a href="ad0234829205b9033196ba818f7a872b"></a><scri-pt>alert('xss')</scri-pt><a href="ad0234829205b9033196ba818f7a872b">Link Text</a>
Step 6:
<a href=" "></a><scri-pt>alert('xss')</scri-pt>
<a href=" ">Link Text</a>

HTML/XML/JSON/Etc Syntax Method of Exploit Generation

A method including the following steps may be used in the generation of an exploit and is exemplified with respect to HTML below:

Step 1: Find Slug (e.g., MD5 CheckSum or part thereof) in HTML/Script/JSON/XML/etc. and use context/syntax to determine characters needed to test;
Step 2: Use XSS Test Method to determine characters that pass through filter;
Step 3: Build custom exploit with syntactically correct HTML/XML/JSON/etc based on characters that pass through filter from XSS Test Method. Here, build/generate an exploit means the application automatically determines the sequence of characters needed to create syntactically correct code that will execute;
Step 4: Check if syntactically correct exploit string passes through the target application's filter. The correctness of the syntax can be checked, for example, by the call back method, out-of-band method and/or in a sandbox method;
Step 5: If the exploit is determined to pass through the application's filter, remove the default slug portion and save the validated exploit. For example,
store Signature XSS String: <scri-pt>alert('xss')</scri-pt> in computer memory and optionally generate report including the exploit(s).

Method for Discovering the Size/Maximum Size of a Field

There may be cases in which the size of the exploit or putative exploit must be determined. This computer-implemented method allows the length of the field and or database field to be discovered so that the correct size exploit may be determined and used. The method may include the following steps:

1. Select/generate a unique long slug. (While this could be any length string one would like to test; ideally it is at least the length of the exploit.);
2. Submit the long slug to application;
3. Check resulting output for the slug;
4. If not found, check remove one character from the unique long slug and check again;
5. Repeat checks until field is found; and
6. Determine difference in size between the slug found in application and one submitted to get length of field.

The determined field size may be used to optimize the exploit. This method of determining field size may be used in addition to and/or in conjunction with any of the other embodiments of the invention and variations thereof described herein. Some fields have a fixed length and some do not have a fixed length. For those that are fixed, the length may be determined. Once it is determined that there is a stored field (by seeing a single test slug reflect) then the size of the field can be determined in the process of character testing (one way). Another way to determine field size is to start testing characters first after it has been found that the default slug has reflected and then add characters to it and resubmit it until an upper limit is reached, i.e., until the string is no longer reflecting (not as complete but quicker than the first method).

FIG. 5 shows a network-connected computer system embodiment 501 of the invention with various interacting target application computer systems shown. Computer system 501 of the embodiment includes a processor 502 (i.e., computer processor), processor-accessible memory 503, processor-executable computer instructions 504 stored in memory 503, at least one input device 505 such as a keyboard or microphone operably connected to the processor, at least one output device 506 under control of the processor such as a display or a printer, and a network communications server 507 that permits data to be sent to and received from other computing devices and systems, for example, via the Internet, a cellular telephone network, a private data network and/or a direct data transfer connection. Memory 503 also includes one or more data structures, such as one or more relational databases, for storing data utilized by and generated by the system in the course of its operation. Server 507 may also be considered an output device. The aforementioned components of system 501 are collectively mutually configured to provide the following functional modules of the system as directed by the processor under control of the computer instructions:

(1) a Target Application Designation Module 508 which permits a user of the system to input, for example via input device 505 a target application, such as a web page for which XSS vulnerability testing is desired. Target Application Designation Module 508 may, for example, present a user interface such as a secure web page with which the user can input the designation(s);

(2) Field/Parameter/URL Determination Module 509 that determines, for example, by spidering and/or by forcing errors, what the fields, parameters and/or URLs are for the target application. At least some of this information may already exist, for example, in a compiled form and be uploaded or otherwise entered and stored in memory 503;

(3) a Default Slug Generation, Loading and Detection Module 510 that generates a default slug which is a string of characters, such as non-special characters, and submits (loads) the default slug to the application via the fields/parameters/URLs etc. and determines (detects) where, if at all, and how the default slug is returned by the target application, i.e. a reflected slug, stored slug, in-memory slug and/or DOM, etc. This module may also be configured to detect and parse out the context and/or syntax in/with which the returned slug appears, and store the results in the memory;

(4) a Test Slug Generation and XSS Testing Module 511 that (i) generates test slugs consisting of two default slugs which are the same or different (that was/were determined by Module 510 to be reflected by the target application) surrounding a test character or test string of multiple test characters, such as but not limited to a special character or a string of characters including one or more or all special characters, (ii) submits the generated test slugs in the target application fields, parameters and/or URLs to the target application, (iii) determines if and where the test slugs are returned and whether any of the characters (which may or may not have passed through a filter if the application has a filter) in the test string of the test slug are transformed in the returned test slug or not, and (iv) stores the results of the testing in memory 503. For a given length or given lengths of the test slugs, Module 511 may be configured to generate and submit all possible test slugs to the target application.

(5) an Exploit Generation and Validation Module 512 configured to (i) build/generate custom exploits with syntactically correct HTML/XML/JSON/etc. based on characters that are returned by the application (which may or may not have passed through a filter if the application has a filter) from XSS Testing by Module 511, (ii) determine if syntactically correct (executable) exploit string(s) passes through filter (the correctness of the syntax can be checked, for example, by the call back method, out-of-band method and/or in a sandbox method), and (iii) if a validated exploit is determined, saving the exploit in memory 503; and (6) a Report Generation Module 513 configured to generate and output a vulnerability testing results report via output device 506 or electronically in a file via server 507 which report includes, for example, an identification of any fields, parameters, URLs in which a test slug submission resulted in a reflection in which one or more test characters of the test slug were transformed, and identification of the corresponding character(s) and/or string of characters that experienced a transformation, and a description of any exploit generated and validated (for a field, parameter, URL, etc.) by Module 512.

As further shown in the FIG. 5, system 501 is operably connected for two-way communication to a communications network 520, such as the Internet, a cellular telephone network, a local area network, and/or a private communications network, via server 507. Target applications 531 and 532 to be tested by system 501 are provided by computer systems that are similarly operably connected for two-way communication to network 520. For example, target applications 531 and 532 may be web pages served by remote web servers in the normal course of their operation and system 501 may interrogate the target applications via their regular communication network connection(s).

Advantageously, the methods of the invention may be directed to an entire target application, such as an entire web site, or to particular sub-applications such as login pages, shopping carts, forms, web pages, dynamic content, etc. Further, the methods of the invention may be implemented in and with respect to different programming languages and with and upon different platforms. The methods and systems of the invention are applicable to security issues and problems that occur in the context of modern computing systems, especially with respect to computers communicating over a communications network such as the Internet.

The examples above are simplified for the sake of illustration and do not showing testing of alphanumeric characters, e.g., A-Z and 0-9. Such characters, like the special characters, may be tested according to the invention. In addition, any type of characters or subset of characters or combinations thereof may be tested according to the invention. For example, any or all of special characters, alphanumeric characters, and non-printable characters may be tested for an application. Also, any character set, such as ASCII or Unicode, or combinations thereof may be tested.

Reference is made throughout this disclosure to browser-interpretable (or -executable) code such as HTML and scripting language such as JavaScript, and VBscript and internal data structures (referenced data) such as Document Object Model (DOM). It should be understood that the invention is applicable to any type of browser-interpretable (or -executable) code, scripting language or internal data structure (referenced data) and that wherever in this application any of these categories or particular examples thereof is referenced, the invention also provides corresponding embodiments for the remaining categories generally and for the particular examples within those categories that are disclosed herein.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable medium containing computer program code, which can be executed by a computer processor for performing any or all of the steps, operations, or processes described.

As known in the art, various data structures such as databases, for example, relational databases may be used to implement various aspects of the methods of the invention.

Embodiments of the invention may also relate to computerized systems for performing the operations herein. Such apparatuses include a processor, processor accessible tangible memory and computer instructions (computer program) stored in the tangible processor accessible memory. Furthermore, any computing systems referred to in the specification may include a single processor or may be architectures employing multiple processor designs for increased computing capability. It should also be understood that various of the operations and aspects of embodiments of the invention may be performed by distributed apparatuses.

The vulnerability detecting computer systems of the invention may interrogate subject systems/applications remotely via a communications connection, for example, via a communications network such as the Internet. Thus, the computer systems of the invention may include a communications network server/module that may, for example, include and/or be physically connected to a communication network infrastructure by one or more electrical wires, such as twisted wires, e.g., twisted, copper wire(s) or coaxial cables such as copper or aluminum wire wrapped with an insulating and flexible material, and/or by one or more optical fibers such as by an optical fiber cable/bundle.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above. In addition, methods including steps as described herein may be performed in the step-wise order presented or in any operable order, all of which are intended to be within the scope of the invention.

The following computer program listing exemplifies computer code configured to parse out the syntax (such as special characters) surrounding a returned default slug and determine which characters may be added (in the space occupied by the returned default slug) in order to build a syntactically correct piece of executable code, i.e., an exploit. By syntactically correct code, it is meant herein that the browser or similar subject application will be able to interpret the exploit and execute it, not that perfect HTML, JavaScript, etc. is present, since browsers and like applications through normal function allow for deviations/errors in HTML/XML/JSON/etc. FIG. 6 shows an exemplary report showing the parsing and exploit generation results obtained by the program. Other computer code provided by the invention can be configured to direct the computer system of the invention to generate and submit (attempt to load) test slugs to the target application which consist of one or more test characters or strings, which may include the required character(s) or strings in encoded or un-encoded form, but can be any characters or strings, sandwiched between two default slugs (which may be the same or different) and determine if the application returns the test slug with the characters required to form executable code, i.e., an exploit.

Computer Program Listing Appendix

```python
#!/usr/bin/python
# -*- coding: utf-8 -*-
#-------------------------------------------------------------------------------
#   Copyright © 2014 Silverback Ventures, LLC - All Rights Reserved
------------------------------------------------------------------------------- import re def special_chars(html):
    resultNoAscii = ""
    for c in html:
        #print c
        if not ((ord(c) <= 32) or (ord(c) >= 48 and ord(c) <= 57) or (ord(c) >= 65 and ord(c) <= 122)):
            resultNoAscii = resultNoAscii + c return resultNoAscii def special_chars_unique(html):
    resultNoAscii = ""
    for c in html:
        #print c
        if not ((ord(c) <= 32) or (ord(c) >= 48 and ord(c) <= 57) or (ord(c) >= 65 and ord(c) <= 122)):
#            if ord(c) < 128:
#                print str(ord(c)) + " : " + str(c)
            if not c in resultNoAscii:
                resultNoAscii = resultNoAscii + c return resultNoAscii
```

```python
def reverseSequence(c):
    return c[::-1]

def buildExploitAttributeReverseMethod(HTMLfull, slug, exploitCode):
    return str(HTMLfull.split(slug, 1)[1] + exploitCode + HTMLfull.split(slug, 1)[0] )

def XSS_char_test_ExploitSyntaxPre(HTMLfull, slug):
    exploitStartSyntax = ""
    exploitEndSyntax = ""

matches = re.findall('<.*?>', HTMLfull)
    for m in matches:
        if slug in m:
            exploitStartSyntax = special_chars(m.split(slug, 1)[1])
            #print m return special_chars_unique(exploitStartSyntax)

def XSS_char_test_ExploitSyntaxFullHTML(HTMLfull, slug):
    exploitStartSyntax = ""
    exploitEndSyntax = ""

matches = re.findall('<.*?>', HTMLfull)
    for m in matches:
        if slug in m:
```

```
    exploitStartSyntax = special_chars(m.split(slug, 1)[1])
    #print m if not slug in m:
    exploitEndSyntax = m
    #print m return special_chars_unique(exploitStartSyntax + exploitEndSyntax)

def XSS_char_test_ExploitSyntaxFullHTMLwExploit(HTMLfull, slug, exploitCode):
    exploitStartSyntax = ""
    exploitEndSyntax = ""

matches = re.findall('<.*?>', HTMLfull)
    for m in matches:
        if slug in m:
            exploitStartSyntax = special_chars(m.split(slug, 1)[1])
            #print m if not slug in m:
            exploitEndSyntax = m
            #print m exploit = exploitStartSyntax + exploitCode + exploitEndSyntax
    return special_chars_unique(exploit)

def buildExploitAttribute(HTMLfull, slug, exploitCode):
    exploitStartSyntax = ""
    exploitEndSyntax = ""

matches = re.findall('<.*?>', HTMLfull)
```

```
    for m in matches:
        if slug in m:
            exploitStartSyntax = special_chars(m.split(slug, 1)[1])
            #print m if not slug in m:
            exploitEndSyntax = m
            #print m exploit = exploitStartSyntax + exploitCode + exploitEndSyntax
    return exploit def buildExploitBodyAttribute(HTMLfull, slug, exploitCode):
    exploitStartSyntax = ""
    exploitEndSyntax = ""

matches = re.findall('<.*?>', HTMLfull)
    for m in matches:
        if slug in m:
            exploitStartSyntax = special_chars(m.split(slug, 1)[1])
            #print m if not slug in m:
            exploitEndSyntax = m
            #print m exploit = exploitStartSyntax + exploitCode + exploitEndSyntax
    return exploit def printStringCharacters(HTMLfull):
```

```
    print "Left String: " + str(returnLeftString(HTMLfull))
    print "Right String: " + str(returnRightString(HTMLfull))
    print "Left Characters: " + str(special_chars(returnLeftString(HTMLfull)))
    print "Right Characters: " + str(special_chars(returnRightString(HTMLfull)))

def returnLeftString(HTMLfull):
    return str(HTMLfull.split(slug, 1)[0])

def returnRightString(HTMLfull):
    return str(HTMLfull.split(slug, 1)[1])

def demoHTMLtextExploit(HTMLfull, slug, exploitCode):

print
    print "XSS_char_test (XSS_char_test_ExploitSyntaxPre): " + str(XSS_char_test_ExploitSyntaxPre(HTMLfull, slug))
    print "XSS_char_test (XSS_char_test_ExploitSyntaxFullHTML): " + str(XSS_char_test_ExploitSyntaxFullHTML(HTMLfull, slug))

print "XSS_char_test buildExploitFull: " + str(buildExploitFull(HTMLfull, slug, exploitCode))

print
    exploit = buildExploitAttribute(HTMLfull, slug, exploitCode)
    print "Exploit String (buildExploitAttribute): " + str(exploit)
    print "Full HTML Syntax with Exploit (buildExploitAttribute): " + str(HTMLfull.split(slug, 1)[0] + exploit + HTMLfull.split(slug, 1)[1])

print
    XSS_char_test = special_chars_unique(exploit)
    print "XSS_char_test (XSS_char_test_ExploitSyntaxFullHTMLwExploit): " +
```

```
  str(XSS_char_test_ExploitSyntaxFullHTMLwExploit(HTMLfull, slug, exploitCode))

def demoHTMLAttributeExploit(HTMLfull, slug, exploitCode):

print
  print "XSS_char_test (XSS_char_test_ExploitSyntaxPre): " +
str(XSS_char_test_ExploitSyntaxPre(HTMLfull, slug))
  print "XSS_char_test (XSS_char_test_ExploitSyntaxFullHTML): " +
str(XSS_char_test_ExploitSyntaxFullHTML(HTMLfull, slug))

print
  exploit = buildExploitAttributeReverseMethod(HTMLfull, slug, exploitCode)
  print "Exploit String (buildExploitAttributeReverseMethod): " + str(exploit)
  print "Full HTML Syntax with Exploit (buildExploitAttributeReverseMethod): " +
str(HTMLfull.split(slug, 1)[0] + exploit + HTMLfull.split(slug, 1)[1])

print
  exploit = buildExploitAttribute(HTMLfull, slug, exploitCode)
  print "Exploit String (buildExploitAttribute): " + str(exploit)
  print "Full HTML Syntax with Exploit (buildExploitAttribute): " + str(HTMLfull.split(slug, 1)[0] +
exploit + HTMLfull.split(slug, 1)[1])

print
  XSS_char_test = special_chars_unique(exploit)
  print "XSS_char_test (XSS_char_test_ExploitSyntaxFullHTMLwExploit): " +
str(XSS_char_test_ExploitSyntaxFullHTMLwExploit(HTMLfull, slug, exploitCode))

def demoHTMLBodyAttributeExploit(HTMLfull, slug, exploitCode):

#  print "XSS_char_test buildExploitFull: " + str(buildExploitFull(HTMLfull, slug, exploitCode))
```

```
#Here we dynamically determine syntax to see if it should be a double or single quote
if "\"" in str(XSS_char_test_ExploitSyntaxPre(HTMLfull, slug)):
    syntaxPre = "\""
    exploitCode = exploitCode.replace("ReplaceQuote", "\"")
if "'" in str(XSS_char_test_ExploitSyntaxPre(HTMLfull, slug)):
    syntaxPre = "'"
    exploitCode = exploitCode.replace("ReplaceQuote", "'")

print
    print "XSS_char_test (XSS_char_test ExploitSyntaxPre): " + str(special_chars_unique(syntaxPre))
    print "XSS_char_test (XSS_char_test ExploitSpecialCharacters): " + str(special_chars_unique(exploitCode))
    print "XSS_char_test (XSS_char_test_ExploitSyntaxFullHTML): " + str(special_chars_unique(str(HTMLfull.split(slug, 1)[0] + exploitCode + HTMLfull.split(slug, 1)[1])))

print
    print "Dynamically Created Exploit String (Using " + syntaxPre + " ): " + str(exploitCode)
    print "Full HTML Syntax with Exploit (buildExploitAttribute): " + str(HTMLfull.split(slug, 1)[0] + exploitCode + HTMLfull.split(slug, 1)[1])

print
    XSS_char_test = special_chars_unique(exploitCode)
    print "XSS_char_test (XSS_char_test_ExploitSyntaxFullHTMLwExploit): " + str(XSS_char_test_ExploitSyntaxFullHTMLwExploit(HTMLfull, slug, exploitCode))

#==================================================
#   Start xssWarrior Demo Exploit Script
#==================================================
```

```
preHTML = "<!DOCTYPE html><html><head><title></title></head><body>"
postHTML = "</body></html>"

exploitCode = "<script>alert('XSS!')</script>"

print "#----------------------------------------------"
print "#   HTML Text"
print "#----------------------------------------------"

slug = "6ea261c8cf3d49c7fe1ab1a8fc2bfa22"
HTMLstart = "<a href=\"http://xssWarrior.com\">"
HTMLend = "</a>"

HTMLfull = HTMLstart + slug + HTMLend print "Full HTML string: " + str(HTMLfull)

printStringCharacters(HTMLfull)
demoHTMLtextExploit(HTMLfull, slug, exploitCode)

print
print "#----------------------------------------------"
print "#   HTML attribute (Case #1: Single Quote)"
print "#----------------------------------------------"

slug = "6ea261c8cf3d49c7fe1ab1a8fc2bfa22"
HTMLstart = "<a href='"
HTMLend = "'>website link</a>"

HTMLfull = HTMLstart + slug + HTMLend print "Full HTML string: " + str(HTMLfull)
```

```
printStringCharacters(HTMLfull)
demoHTMLAttributeExploit(HTMLfull, slug, exploitCode)

print
print "#----------------------------------------------"
print "#    HTML attribute (Case #2: Double Quote)"
print "#----------------------------------------------"

slug = "6ea261c8cf3d49c7fe1ab1a8fc2bfa22"
HTMLstart = "<a href=\""
HTMLend = "\">website link</a>"

HTMLfull = HTMLstart + slug + HTMLend print HTMLfull printStringCharacters(HTMLfull)
demoHTMLAttributeExploit(HTMLfull, slug, exploitCode)

print
print "#----------------------------------------------"
print "#    HTML attribute (Case #3a: Dynamic Exploit Choice)"
print "#----------------------------------------------"

slug = "6ea261c8cf3d49c7fe1ab1a8fc2bfa22"
HTMLstart = "<body BGCOLOR=\"#FFFFCC\">"
HTMLend = "</body>"

HTMLfull = HTMLstart + slug + HTMLend print HTMLfull
```

```
# this represents that we can tell the context dynamically and set it
in the actual application the context is figured out using XPATH
isBodyTagAttribute = False if isBodyTagAttribute:
    exploitCode = " onload=EvilExploit()"

printStringCharacters(HTMLfull)
demoHTMLAttributeExploit(HTMLfull, slug, exploitCode)

print
print "#-----------------------------------------------"
print "#   HTML attribute (Case #3b: Dynamic Exploit Choice Double Quote)"
print "#-----------------------------------------------"

slug = "6ea261c8cf3d49c7fe1ab1a8fc2bfa22"
HTMLstart = "<body  BGCOLOR=\""
HTMLend = "\"></body>"

HTMLfull = HTMLstart + slug + HTMLend print HTMLfull this represents that we can tell the context dynamically and set it
in the actual application the context is figured out using XPATH
isBodyTagAttribute = True if isBodyTagAttribute:
    DynamicExploitCode = " ReplaceQuote onload=ReplaceQuoteEvilExploit()ReplaceQuote notag=ReplaceQuote"
```

```
print "Original Exploit (quote type is unknown): " + str(DynamicExploitCode)
printStringCharacters(HTMLfull)
demoHTMLBodyAttributeExploit(HTMLfull, slug, DynamicExploitCode)

print
print "#----------------------------------------------"
print "#   HTML attribute (Case #3c: Dynamic Exploit Choice Single Quote)"
print "#----------------------------------------------"

slug = "6ca261c8cf3d49c7fc1ab1a8fc2bfa22"
HTMLstart = "<body  BGCOLOR='"
HTMLend = "'></body>"

HTMLfull = HTMLstart + slug + HTMLend print HTMLfull isBodyTagAttribute = True if isBodyTagAttribute:
    DynamicExploitCode = " ReplaceQuote onload=ReplaceQuoteEvilExploit()ReplaceQuote notag=ReplaceQuote"

print "Original Exploit (quote type is unknown): " + str(DynamicExploitCode)
printStringCharacters(HTMLfull)
demoHTMLBodyAttributeExploit(HTMLfull, slug, DynamicExploitCode)
```

What is claimed is:

1. A computer-implemented method for testing an application for cross-site scripting vulnerabilities, comprising the steps of:

under control of at least one processor,
(a) for at least one field, parameter or Uniform Resource Locator (URL) of the application, submitting a request in which the field, parameter or URL contains a test slug consisting of an encoded or non-encoded test character or a string of test characters between two default slugs;
(b) determining when the application returns the test slug with the test character or string of test characters and whether any of the test characters in the test slug are transformed or not transformed in the returned test slug;
(c) storing in non-transitory computer memory the result of the determinations made in step (b);
(d) repeating steps (a)-(c) for a plurality of different test characters or strings of test characters;
(e) generating at least one exploit by automatically determining the sequence of characters needed to create syntactically executable correct code;
(f) storing the at least one exploit in non-transitory computer memory; and
(g) before steps (a)-(d),
  (i) for at least one field, parameter or URL of the application, submitting a request in which the parameter, field or URL contains a default slug not having any special characters; and
  (ii) determining when the application reflects the default slug without any transformation of characters in response to the request,
wherein when the application returns the default slug without any transformation of characters, the test slug used in step (a) consists of the encoded or non-encoded test character(s) sandwiched between two default slugs which are the same or different.

2. The computer-implemented method of claim 1, wherein the test character is a special character or at least one of the test characters of the string of test characters is a special character.

3. A computer system configured to test an application for cross-site scripting vulnerabilities, comprising:

at least one processor;
non-transitory processor-accessible memory; and
computer instructions stored in the non-transitory processor-accessible memory, said computer instructions configured to direct the at least one processor to perform the steps of:

(a) for at least one field, parameter or Uniform Resource Locator (URL) of the application, submitting a request in which the field, parameter or URL contains a test slug consisting of an encoded or non-encoded test character or a string of test characters between two default slugs;
(b) determining when the application returns the test slug with the test character or string of test characters and whether any of the test characters in the test slug are transformed or not transformed in the returned test slug;
(c) storing in the non-transitory processor-accessible memory the result of the determinations made in step (b);
(d) repeating steps (a)-(c) for a plurality of different test characters or strings of test characters;
(e) generating at least one exploit by automatically determining the sequence of characters needed to create syntactically executable correct code;
(f) storing the at least one exploit in the non-transitory processor-accessible memory; and
(g) before steps (a)-(d),
  (i) for at least one field, parameter or URL of the application, submitting a request in which the parameter, field or URL contains a default slug not having any special characters; and
  (ii) determining when the application reflects the default slug without any transformation of characters in response to the request,
wherein when the application returns the default slug without any transformation of characters, the test slug used in step (a) consists of the encoded or non-encoded test character(s) sandwiched between two default slugs which are the same or different.

4. The computer system of claim 3, wherein the test character is a special character or at least one of the test characters of the string of test characters is a special character.

5. The computer system of claim 3, further comprising:
a communication module under control of the at least processor, the communications module configured to provide communication between the computer system and the application to be tested for cross-site scripting vulnerabilities by the computer system.

6. The computer system of claim 5, wherein the test character is a special character or at least one of the test characters of the string of test characters is a special character.

* * * * *